Oct. 16, 1934.  A. W. HAYDON  1,977,185
ELECTRIC MOTOR
Filed Oct. 16, 1933
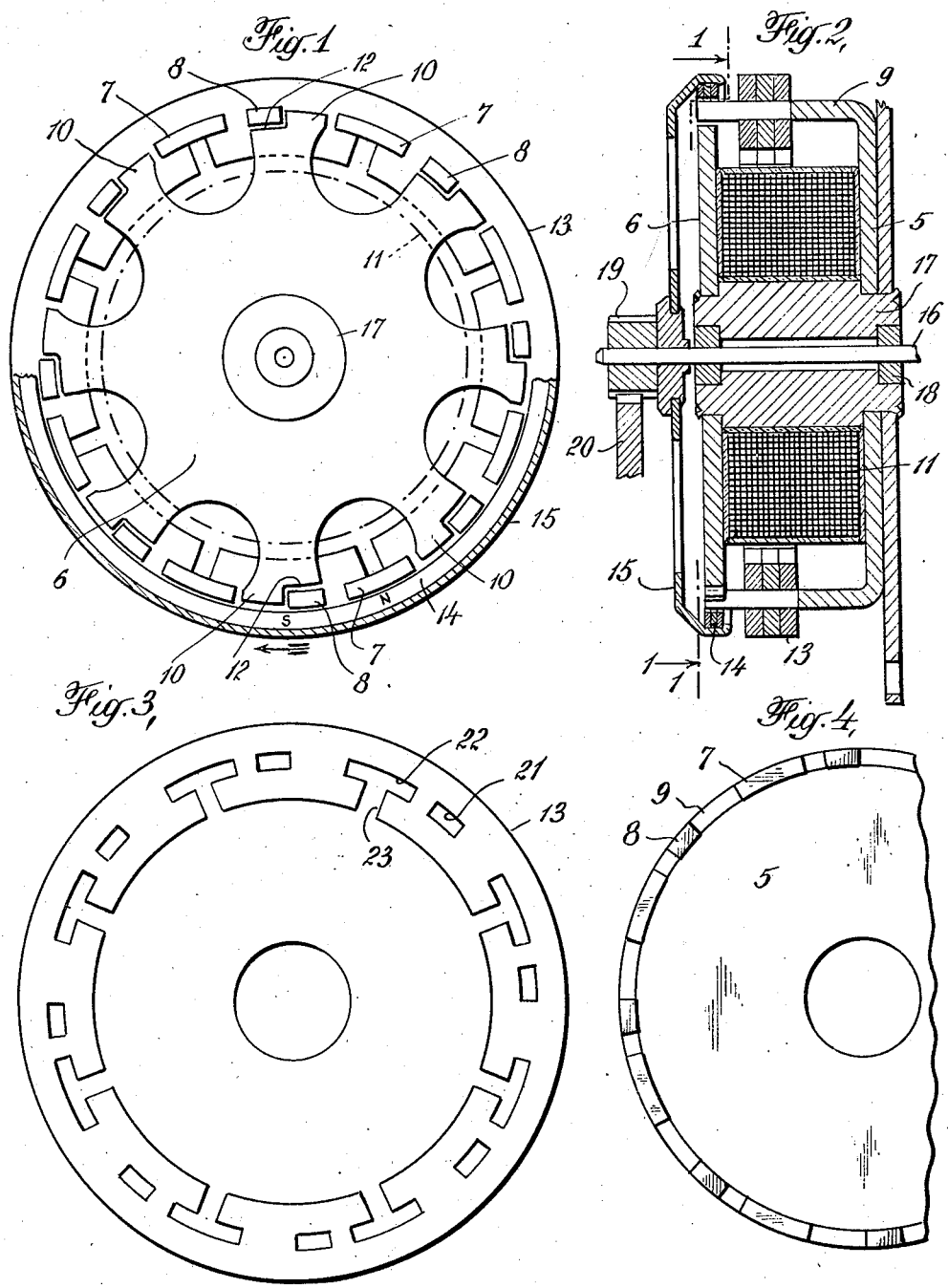
INVENTOR
Arthur William Haydon
BY
Pennie, Davis, Marvin & Edmonds
HIS ATTORNEYS Patented Oct. 16, 1934

1,977,185

UNITED STATES PATENT OFFICE 1,977,185

ELECTRIC MOTOR

Arthur William Haydon, Waterbury, Conn.

Application October 16, 1933, Serial No. 693,706

16 Claims. (Cl. 172—275)

This invention relates to electric motors and particularly to single-phase self-starting motors of a type suitable for operating clock mechanisms and other timing devices.

For many purposes it is desirable to provide a self-starting single-phase motor capable of developing considerable starting torque, and also capable of operating at a constant speed determined by the frequency of the alternating current supplied to the motor.

The operating speed of a synchronous motor for a given frequency of alternating current is determined by the ratio between the angular space relation of adjacent field poles and the time phase relation of the magnetic flux in such poles. Thus considering a motor in which adjacent field poles are spaced 22½ mechanical degrees apart and the time phase displacement of flux in such adjacent poles is 180 electrical degrees, the synchronous speed of the motor on 60 cycle alternating current will be $$\frac{22.5}{180} \times 60 \times 60 = 450 \text{ R. P. M.}$$

In this equation, the only variable factor at a given frequency is the ratio between the mechanical angle of pole displacement and the phase displacement of flux for adjacent poles. For convenience, this ratio will be termed the speed ratio herein.

In general, it is desirable that small synchronous motors for operating clock mechanisms or other timing devices run at as low a synchronous speed as practically possible, and this in order to reduce the wear on the moving parts and the noise produced by the operation of the device, as well as to minimize the amount of reduction gearing required. In the past, low operating speeds have been attained by using a very large number of poles and in this manner reducing the above explained speed ratio. This expedient is satisfactory in certain cases if the motor is of the non-self-starting type, but is impractical in a self-starting motor. Single-phase alternating current motors of the type here considered are made self-starting by the use of shaded poles, that is, a closed conductor is placed about certain of the poles or pole pieces of the motor. In known constructions, these shaded poles occupy considerable space with the result that the number of unshaded poles or the size thereof must be reduced in order to accommodate the shaded poles. Both of these expedients are undesirable since reduction in the number of unshaded poles increases the speed ratio and motor speed, whereas a reduction in the size of the unshaded poles reduces the operating torque of the motor.

It is the object of the present invention to provide a self-starting single-phase alternating current motor which operates at a comparatively low constant speed and has a high starting torque and operating torque, the motor being of very compact and simple construction.

In general, the object of the invention is carried out by providing a field member including an arrangement of shaded and unshaded poles which produces at least two different speed ratios, and by so locating the shaded poles that a reduction of the number or effective size of the unshaded poles is unnecessary. Thus the motor preferably includes a number of shaded poles which cooperate with the unshaded poles to produce a relatively high speed ratio starting torque, the unshaded poles cooperating with each other to produce a lower speed ratio operating or governing torque, which determines the speed of the motor. The shaded poles are disposed in the flux path of certain unshaded poles, preferably in recesses formed in the faces of the unshaded poles, with the result that the shaded poles act as portions of the flux paths of the associated unshaded poles. In this manner, any decrease in the effective size or number of unshaded poles due to the presence of the shaded poles is avoided.

Various other specific objects, advantages and characteristic features of the invention will become apparent as the description thereof progresses.

The invention will be best understood by reference to the accompanying drawing in which one embodiment of my improved motor has been illustrated. In the drawing;

Figure 1 is a plan view of a motor embodying my invention, taken along the line 1—1 of Figure 2 with a portion of the rotor element cut away;

Figure 2 is a sectional elevation of the motor shown in Figure 1;

Figure 3 is a plan view of the shading ring employed in the motor of Figure 1; and Figure 4 is a partial plan view of one of the field casing sections of the motor.

The embodiment of my invention here disclosed comprises a motor having a substantially cylindrical field element comprising an outer casing section 5 and an inner casing section 6 mounted respectively at opposite ends of a central core 17. The outer casing section 5 includes a lateral cup-like extension 9 of cylindrical form, the inner edge of which is notched to form a plurality of 110 poles or pole pieces 7 and 8. As shown in Figure 4, the pole pieces 7 are of considerably greater peripheral width than the pole pieces 8, and the pole pieces 7 and 8 are alternately disposed about the periphery of the field casing section.

The inner field casing section 6 comprises a flat disk having a plurality of radial extensions which form the pole pieces 10. As shown in Figure 1, the pole face of each pole 10 is cut away to provide a recess 12 extending substantially from the center line of the pole to one side thereof.

The casing sections 5 and 6 are made of suitable magnetic material of low hysteresis characteristic, such as soft iron. The casing sections 5 and 6 are nested together, as shown in Figures 1 and 2, with the pole pieces 8 on the outer section 5 fitting into the recesses 12 of the pole pieces 10 on the inner section 6, and the pole pieces 7 of the outer section lying adjacent the tips of the poles 10 on the inner section.

With the casing sections 5 and 6 thus assembled, it will be seen by reference to Figure 1 that the outer faces of the poles 7 and 8 lie at a slightly greater radial distance from the center of the structure than do the outer faces of the poles 10. Also, the poles 8 are spaced a slight radial distance from the poles 10, leaving an air gap between the inner face of each pole 8 and the inner wall of the recess 12 in each pole 10. This arrangement provides a flux path of substantially uniform magnetic reluctance across the entire face of the pole 10. It should be understood that when flux passes through each pole 10, the tip of the pole 8 disposed in the recess 12 of such pole 10 acts as a portion of the magnetic path for this flux. In other words, each pole 8, in addition to carrying a distinct flux of its own, also acts as a portion of the flux path for the associated pole 10. The poles 10 are of slightly greater circumferential width than the poles 7 and the increased air gap between the poles 10 and the adjacent armature 14 equalizes the reluctance of the flux path between the poles 10 and the armature 14 with that of the flux path between the poles 7 and the armature 14. This equalization of the reluctances of the several flux paths is not essential to my invention.

The rotor member 15 of the motor is mounted on a shaft 16 journaled in a central opening through the core 17. The motor may be connected to drive a clock mechanism or any other timing means, and for this purpose a pinion 19 meshing a gear 20 has been shown fixed on one end of the shaft 16. The armature 14 of the rotor is ring shaped and is disposed to surround and lie adjacent to the poles 7, 8 and 10 of the field element, as shown in Figures 1 and 2. The armature 14 is preferably made of hardened steel or other magnetic material having a high hysteresis coefficient so that it offers considerable resistance to any attempt to change its magnetism. I have found that the efficiency and the torque developed by my motor can be materially increased by forming the armature 14 of a plurality of superimposed rings, and a subdivided armature constructed in this manner has been illustrated in the drawing. The subdivision of the armature 14 substantially eliminates the induction of eddy currents in the armature by the alternating flux from the field element, and thus increases the efficiency of the motor. Further, by forming the armature 14 of a set of superimposed rings, the manufacture of the armature is simplified. The individual rings making up the armature 14 have a radial width greater than their thickness and accordingly can be readily punched from sheet material, whereas the completed armature is of greater thickness than radial width, and accordingly could not be punched in a single piece by ordinary manufacturing methods.

The field element of the motor is magnetized by a field coil 11 disposed about the central core 17 between the casing sections 5 and 6. When this coil is magnetized with alternating current, the casing sections 5 and 6, which lie on opposite sides of the coil, are magnetized in such a way as to produce flux of opposite polarity, which polarity alternates in synchronism with the current in the coil. The pole pieces 7, 8 and 10 carry this alternating flux, but shading or phase shifting means are provided on the poles 8 to cause the effective flux therein to lag approximately 90 electrical degrees in time phase relation behind the flux in the poles 7. The shading means for the poles 7 may comprise any suitable conductors which surround the individual poles. As shown in the drawing, a plurality of shading rings 13 are provided, each of which has a portion surrounding each of the poles 8. The rings 13 are formed of copper or similar material of high conductivity, and are provided with a plurality of openings 21 through which the poles 8 pass. The rings 13 also have openings 22 to accommodate the poles 7, but the openings 22 are not completely surrounded by a conductive path, a slot being provided between each opening 22 and the adjacent inner edge of the ring 13. With this arrangement, each pole 8 is surrounded by a highly conductive path with the result that the primary flux induced by the coil 11 in each pole 8 induces a current in the rings 13 about the pole and this current in turn induces a secondary flux in the pole. This secondary flux lags approximately 90 electrical degrees behind the primary flux. In this manner, the effective flux from each shaded pole 8 is caused to lag approximately 90 electrical degrees behind the flux in the adjacent unshaded pole 7.

In the operation of my improved motor, the flux from the unshaded or main poles 7 and 10 creates magnetic poles of opposite polarity in the adjacent portions of the armature 14. Thus, as shown in Figure 1, at the instant that the flux through the pole 7 is in such a direction as to make this a south magnetic pole, a north magnetic pole is created in the adjacent portion of the armature 14, as indicated at N, and at the same time, the pole 10, which is oppositely polarized, creates a south magnetic pole in the adjacent portion of the armature 14, as indicated at S. Thus the poles 7 and 10 create a magnetic pattern in the armature 14 which magnetism persists until disturbed by these field poles upon rotation of the armature or change in polarity of these poles.

The flux from the shaded poles 8 is so controlled that this flux is not strong enough to disturb the magnetic pattern created in the armature 14 by the poles 7 and 10. In other words, this flux from the poles 8 is incapable of either destroying the residual armature poles S and N created by the poles 7 and 10 or of creating new magnetic poles in the armature. This relative weakening of the poles 8 may be accomplished by the proper proportioning of several factors. Thus both the current carrying capacity of the shading means on the poles 8 and the reluctance of the leakage path of the flux to these poles affect the amount of flux which passes through the armature due to these poles. Since the effective secondary flux of the poles 8 is induced by the current flowing around these poles in the shading rings 13, the current carrying capacity of these rings may be adjusted to vary the secondary flux. Also, the flux leakage path from the pole 8 to the pole 10 may be designed to carry the desired portion of secondary flux from the pole 8 so that a reduced amount of this flux will pass through the armature 14.

With the arrangement described, the poles 7 and 10 may be considered as creative poles in that they create magnetic poles in the armature 14, whereas the shaded poles 8 may be considered as reactive poles in that they merely react with the poles created in the armature 14, and thereby produce torque, as hereinafter more fully explained.

The operation of the motor will now be described. When the magnetizing coil 11 is energized with alternating current of say 60 cycle frequency, an alternating field is produced by the poles 7 and 10, which are oppositely polarized by this current, and the polarity of which alternates in synchronism with the current. The field so produced is a stationary axis field and is accordingly incapable of producing torque in the rotor armature 14 when this armature is at a standstill. The poles 8, however, which are provided with phase shifting or shading means as described above, act with the poles 7 and 10 to produce a rotating axis magnetic field. Thus due to the phase shifting effect of the shading rings 13, the instantaneous flux in the pole 8 lags substantially 90 electrical degrees in time phase relation behind that in the pole 7 and accordingly leads the flux in the pole 10 by substantially 90 electrical degrees. Thus a rotating magnetic field is produced, the polarity of which rotates about the periphery of the field structure, a given polarity existing first at the pole 7, an instant later at the pole 8 and an instant later at the pole 10, and so on around the field structure.

The rotating field discussed above reacts with the armature 14 to produce a torque which starts and accelerates the rotor 15. Thus assuming that at any given instant, the pole 7 is so magnetized as to produce a south magnetic pole, then at the same instant, the pole 10 is so magnetized as to produce a north magnetic pole, and the armature 14 is accordingly oppositely magnetized having a north magnetic pole, designated N, in the portion opposite the pole 7, and a south magnetic pole, designated S, in the portion opposite the pole 10, as shown in Figure 1. As explained above, the shaded pole 8, being disposed in a recess 12 of the pole 10, acts as a portion of the pole face of the pole 10, and the primary flux is substantially uniform along the entire pole face. For this reason, the magnetic pole S created in the armature 14 by the flux from the pole 10 is substantially coextensive with the peripheral dimension of the pole 10 including the portion thereof formed by the tip of the pole 8. Due to the high hysteresis coefficient of the metal comprising the armature rings 14, the induced polarity at S persists and immediately after the assumed instant, the pole 8, which then has a polarity corresponding to a south magnetic pole, attracts the portion N of the armature and simultaneously repels the portion S thereof, thus producing a torque which turns the rotor 15 in the direction indicated by the arrow. Due to the fact that the secondary flux from the pole 8 which acts upon the armature 14 is limited to a low value, as explained above, this flux is incapable of changing the persisting magnetism of the armature. Accordingly, this secondary flux from the pole 8 merely reacts with the armature polarity S and N created by the poles 7 and 10, but does not disturb the magnetic pattern of the armature.

The described repulsion effect of the pole 8 is of greater magnitude than the attractive effect when the motor is at a standstill or turning at low speeds, but as the armature 14 rotates at higher speeds, the attractive effect becomes dominant. Thus with the armature 14 stationary, the shaded pole 8 is closer to the portion S of the armature ring which it repels, than to the portion N thereof which it attracts. When the armature 14 reaches a higher speed however, the portion N thereof is closer to the pole 8 than the portion S thereof when the polarity of this pole is south, and the attractive effect becomes dominant, the repulsive effect being then substantially negligible.

If the armature 14 were effected solely by the rotating magnetic field described, the rotor 15 would accelerate to a speed determined by this field. The torque produced by the attractive effect of the shaded pole 8 on the armature pole N created by the pole 7 becomes strongly negative upon any tendency of the armature speed to exceed the synchronous speed determined by the angular displacement and phase relation of the flux poles 7 and 8 and accordingly the speed of the rotor 15 due to the rotating magnetic field is limited to and determined by the speed ratio of the poles 7 and 8. This synchronous speed is determined by the angular displacement and time phase displacement in flux of the poles 7 and 8. In the illustrated embodiment, the poles 7 and 8 are spaced by an angle of approximately 18½° and the time phase displacement of the flux in these poles at any given instant is approximately 90 electrical degrees. Accordingly, the synchronous speed due to these poles is 725 R. P. M. The rotor never attains this speed due to the governing effect of the alternating or stationary axis magnetic field produced by the poles 7 and 10.

The alternating field created by the poles 7 and 10 produces a torque in the rotor armature in a manner similar to that described above in connection with the high speed ratio starting poles 7 and 8, each field pole 10 attracting the opposite pole induced in the armature 14 by the preceding oppositely polarized field pole 7. This torque differs from that produced by the high speed ratio starting poles in that it is zero at standstill and slightly negative at low speeds, becoming positive only at above approximately one-half synchronous speed. In the disclosed embodiment, the poles 7 and 10, which produce the low speed ratio stationary axis alternating field, are spaced by an angle of approximately 22½° and the phase displacement of the flux in these poles is 180 electrical degrees. Accordingly, the synchronous speed of the field produced by these poles is 450 R. P. M.

After the rotor 15 has accelerated to over one-half of the synchronous speed of the alternating field produced by the governing poles 7 and 10, these poles produce a positive torque which aids in the acceleration of the motor. This torque reaches its maximum positive value at the synchronous speed of the governing poles 7 and 10, in the illustrated case, 450 R. P. M. Upon any tendency of the rotor 15 to accelerate to a higher speed, the change of the armature 14 from a lagging to a leading angle with respect to the alternating flux of the governing poles 7 and 10 produces maximum negative torque which prevents further acceleration. This negative torque is of considerably greater magnitude than the positive torque due to the high speed ratio starting poles 7 and 8 at this speed, and accordingly the motor operates at a constant speed which is the synchronous speed of the low speed ratio governing poles 7 and 10, in the illustrated case, 450 R. P. M. In this manner, the low speed ratio poles act as a governor for limiting the motor speed to a predetermined and constant value.

The negative torque produced by the governing poles 7 and 10 below approximately one-half synchronous speed is so small in magnitude that it does not materially detract from the positive starting torque produced by the starting poles 7 and 8. Further, with my improved armature of uniform magnetic reluctance there is no locking tendency at standstill. Thus the motor starts and accelerates rapidly even under load. The positive torque produced by the low speed ratio governing poles at above approximately one-half synchronous speed is of considerable magnitude, and this torque aids in giving the motor quick acceleration to synchronism and a strong pull-in torque.

The improved motor of the invention has many advantageous features. The location of the shaded poles in recesses in the opposite unshaded poles permits the use of a relatively large number of unshaded poles whereby the operating speed of the motor is relatively low. At the same time, the effective size of the unshaded poles is not reduced to accommodate the shaded poles, and hence the flux and the resultant operating torque produced by the unshaded poles is of a desirably high value. This disposition of the shaded poles in recesses of the opposite unshaded poles gives a powerful repulsion starting effect which materially increases the starting torque, and the high speed ratio attractive starting torque provided by the relative disposition of the shaded poles and the unrecessed unshaded poles insures the acceleration of the motor up to its synchronous speed even when carrying considerable load.

I claim:

1. An alternating current motor comprising a field member and an armature, a pole piece on said field member adjacent said armature, a second pole piece on said field member having a portion thereof disposed in the flux path between said first pole piece and said armature and means for oppositely magnetizing said pole pieces.

2. An alternating current motor comprising a field member and an armature, a pole piece on said field member adjacent said armature, a second pole piece on said field member having a portion thereof disposed in the flux path between said first pole piece and said armature, single phase means for oppositely magnetizing said pole pieces and means for causing a phase displacement of the flux in the pole piece disposed in said flux path.

3. An alternating current motor comprising a field member including two magnetizable sections, single phase means for oppositely magnetizing said sections, a plurality of pole pieces on one of said sections, an armature adjacent said pole pieces and a plurality of pole pieces on the other of said sections, each disposed in the flux path between one of said first mentioned pole pieces and said armature.

4. An alternating current motor comprising a field member including two magnetizable sections, single phase means for oppositely magnetizing said sections, a plurality of pole pieces having recesses therein on one of said sections and a plurality of pole pieces on the oppositely magnetized section extending into the recesses of said recessed pole pieces.

5. An alternating current motor comprising a field member including two magnetizable sections, single phase means for oppositely magnetizing said sections, a plurality of pole pieces having recesses therein on one of said sections, a plurality of pole pieces on the oppositely magnetized section extending into the recesses of said recessed pole pieces and means for causing a phase displacement of the flux in the pole pieces which extend into said recesses.

6. An alternating current motor comprising a field member including two magnetizable sections, single phase means for oppositely magnetizing said sections, a plurality of pole pieces having recesses therein on one of said sections, a group of pole pieces on the other of said sections disposed between said recessed pole pieces and a second group of pole pieces on said other section extending into the recesses of said recessed pole pieces.

7. An alternating current motor comprising a field member including two magnetizable sections, single phase means for oppositely magnetizing said sections, a plurality of unshaded pole pieces having recesses therein on one of said sections, a plurality of unshaded pole pieces on the other of said sections disposed respectively between said unshaded recessed pole pieces and a plurality of shaded pole pieces on said other section each extending into the recess of one of said recessed unshaded pole pieces.

8. An alternating current motor comprising a field member, a rotary armature of uniform magnetic reluctance adjacent said field member, a pole piece on said field member adjacent said armature, a second pole piece on said field member having a portion thereof disposed in the flux path between said first pole piece and said armature and means for oppositely magnetizing said pole pieces.

9. An alternating current motor comprising a field member, a laminated rotary armature of uniform magnetic reluctance adjacent said field member, a pole piece on said field member adjacent said armature, a second pole piece on said field member having a portion thereof disposed in the flux path between said first pole piece and said armature, single phase means for oppositely magnetizing said pole pieces and means for causing a phase displacement of the flux in the pole piece disposed in said flux path.

10. An alternating current electric motor comprising an armature, a field member, single phase means for magnetizing said field member, a plurality of poles on said field member for producing a stationary axis magnetic field having a predetermined speed ratio and a plurality of poles on said field member for producing a rotating axis magnetic field having a higher speed ratio, at least some of the high speed ratio poles being disposed in the flux path between the other poles and said armature.

11. An alternating current electric motor comprising an armature, a field member, single phase means for magnetizing said field member, a plurality of oppositely magnetized poles on said field member arranged to produce a stationary axis alternating magnetic field having a predetermined speed ratio and a plurality of shaded poles on said field member cooperating with at least some of said first mentioned poles to produce a rotating axis magnetic field of a higher speed ratio, said shaded poles being disposed in the flux paths between said first mentioned poles and said armature.

12. An alternating current electric motor comprising a field member, single phase means for magnetizing said field member, an armature mounted adjacent said field member, at least two unshaded poles of opposite polarity on said field member cooperating to produce a stationary axis magnetic field and a shaded pole disposed in the flux path between one of said unshaded poles and said armature and cooperating with the other of said unshaded poles to produce a rotating axis magnetic field.

13. An alternating current electric motor comprising a field member, single phase means for magnetizing said field member, a rotary armature adjacent said field member, and a polar structure on said field member comprising unshaded poles of opposite polarity cooperating to produce a stationary axis magnetic field of predetermined speed ratio and shaded poles respectively disposed in the flux paths between certain of said unshaded poles and said armature and cooperating with the unshaded poles to produce a rotating axis magnetic field of higher speed ratio than that of said stationary axis magnetic field.

14. An alternating current electric motor comprising a field member including two magnetizable sections, single phase means for magnetizing said sections with opposite instantaneous polarity, an armature adjacent said sections, and pole pieces on said sections including a pole piece on one section disposed between two adjacent pole pieces on the other section, with one of said adjacent pole pieces having a portion thereof disposed in the flux path between the intervening pole piece and said armature.

15. An alternating current electric motor comprising a field member including two magnetizable sections, single phase means for magnetizing said sections with opposite instantaneous polarity, an armature adjacent said sections, and pole pieces on said sections including an unshaded pole piece on one section disposed between a shaded pole piece and an unshaded pole piece on the other section, said shaded pole piece having a portion thereof disposed in the flux path between the intervening unshaded pole piece and said armature.

16. An alternating current motor comprising a single movable armature formed of magnetic material having a high hysteresis coefficient, a plurality of creative field poles adjacent said armature having sufficient magnetic strength to create magnetic poles in said armature, and a plurality of reactive field poles adjacent said armature having insufficient magnetic strength to create magnetic poles in said armature, the flux from said reactive poles cooperating with the magnetic armature poles created by the creative field poles to cause movement of the armature.

ARTHUR WILLIAM HAYDON.